United States Patent
Su et al.

(10) Patent No.: US 11,023,432 B2
(45) Date of Patent: *Jun. 1, 2021

(54) FILTER SUGGESTION FOR SELECTIVE DATA IMPORT

(71) Applicant: Microsoft Technology Licensing, LLC, Redmond, WA (US)

(72) Inventors: Churli Su, Bellevue, WA (US); Rameshkumar Perumal, Redmond, WA (US); Liang Huang, Bellevue, WA (US); Sanjay H. Ramaswamy, Redmond, WA (US); Gaston L. Gerchkovich, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,260

(22) Filed: Apr. 7, 2020

(65) Prior Publication Data

US 2020/0233842 A1 Jul. 23, 2020

Related U.S. Application Data

(63) Continuation of application No. 15/618,472, filed on Jun. 9, 2017, now Pat. No. 10,649,966.

(51) Int. Cl.
*G06F 16/21* (2019.01)
*H04L 29/06* (2006.01)
(Continued)

(52) U.S. Cl.
CPC .......... *G06F 16/214* (2019.01); *G06F 16/212* (2019.01); *G06F 16/9535* (2019.01);
(Continued)

(58) Field of Classification Search
CPC .............. G06F 21/6245; G06F 16/214; G06F 16/9535; G06F 16/212; H04L 63/20; G06N 20/00
See application file for complete search history.

(56) References Cited

U.S. PATENT DOCUMENTS

| | | | | |
|---|---|---|---|---|
| 7,747,563 B2* | 6/2010 | Gehring | ................ | G06F 16/254 707/602 |
| 8,396,838 B2* | 3/2013 | Brockway | ............. | G06F 16/313 707/662 |

(Continued)

OTHER PUBLICATIONS

"Intelligent Migration: 10 Techniques for Quickly Migrating Data from Legacy Archives" (12 pages) https://webcache.googleusercontent.com/search?q =cache:wGakUAs5sE0J:https://www.nuix.conn/sites/default/files/White_Paper-_ Intelligent-Migration_US_Web.pdf+&cd=1&hl=en&ct=clnk&gl=US (Year: 2014).*

(Continued)

*Primary Examiner* — Joseph P Hirl
*Assistant Examiner* — Thomas A Gyorfi
(74) *Attorney, Agent, or Firm* — Michael Best & Friedrich LLP

(57) ABSTRACT

When tenants migrate data from on-premises archiving solutions to a hosted service, tenants should maintain just enough data for compliance purposes and dispose of data that is no longer needed to reduce overall liability and compliance risk exposure. Embodiments are directed to providing selective import of data to a hosted service through a security and compliance system associated with the hosted service to reduce overall liability and compliance risk exposure. Data, usage pattern and security/compliance policies associated with a tenant of the hosted service may be analyzed. A model for importing tenant data may be created based on the analysis. A suggestion may be presented to the tenant based on the model, where the sugges- (Continued)

tion includes a filter for importing tenant data. In response to receiving a confirmation to implement the suggestion, the filter may be applied to the tenant data as it is imported to the hosted service.

20 Claims, 11 Drawing Sheets

(51) Int. Cl.
*G06F 16/9535* (2019.01)
*G06F 21/62* (2013.01)
*G06N 20/00* (2019.01)

(52) U.S. Cl.
CPC .......... *G06F 21/6245* (2013.01); *H04L 63/20* (2013.01); *G06N 20/00* (2019.01)

(56) References Cited

U.S. PATENT DOCUMENTS

| | | | | |
|---|---|---|---|---|
| 9,325,709 | B2* | 4/2016 | Beckmann | G06F 16/119 |
| 9,536,096 | B2* | 1/2017 | MacAulay | G06F 40/10 |
| 10,095,800 | B1* | 10/2018 | Yalamanchi | G06F 16/217 |
| 10,331,656 | B2* | 6/2019 | Singh | G06F 16/214 |
| 10,649,966 | B2* | 5/2020 | Su | G06F 21/6245 |
| 2008/0243864 | A1* | 10/2008 | McGauley | G06F 16/27 |
| 2013/0211555 | A1* | 8/2013 | Lawson | H04L 67/16 |
| | | | | 700/28 |
| 2015/0020061 | A1* | 1/2015 | Ravi | H04L 41/0883 |
| | | | | 717/172 |
| 2015/0142858 | A1* | 5/2015 | Bryan | G06F 16/258 |
| | | | | 707/809 |
| 2015/0319185 | A1* | 11/2015 | Kirti | H04L 67/306 |
| | | | | 726/23 |
| 2015/0370674 | A1* | 12/2015 | Lazar | G06F 9/5061 |
| | | | | 705/14.1 |
| 2017/0005987 | A1* | 1/2017 | Masurekar | H04L 63/20 |
| 2017/0324813 | A1* | 11/2017 | Jain | G06F 9/5016 |
| 2017/0353477 | A1* | 12/2017 | Faigon | G06N 7/005 |

OTHER PUBLICATIONS

"Quest: On Demand Migration for Email", https://www.quest.com/products/on-demand-migration-for-email/, Retrieved on: Apr. 25, 2017, 10 pages. (Year: 2017).*

"Nuix: Use Case", https://www.nuix.com/use-case/five-data-migration-headaches, Retrieved on: Apr. 25, 2017, 10 pages. (Year: 2017).*

"Help Center by Infusionsoft : Migrating Data to Infusionsoft", http://help.infusionsoft.com/userguides/contact-management/import-contact-s/migrating-data-to-infusionsoft, Published on: Oct. 7, 2016, 3 pages. (Year: 2016).*

"Announcing the release of Threat Intelligence and Advanced Data Governance, plus updates to Advanced Threat Protection", https://blogs.office.com/2017/04/04/announcing-the-release-of-threat-intelligence-and-advanced-data-governance-plus-significant-updates-to-advanced-threat-protection (10 pages) (Year: 2017).*

* cited by examiner

FILTER SUGGESTION FOR SELECTIVE DATA IMPORT

RELATED APPLICATIONS

This application is a continuation of U.S. patent application Ser. No. 15/618,472, filed Jun. 9, 2017, the entire content of which is incorporated by reference herein.

BACKGROUND

Tenants migrating data from on-premises archiving solutions to hosted services typically need to migrate 100s of terabytes (TBs) of data. However, not all of this data may be relevant from a compliance perspective. Ideally, tenants should maintain just enough data for compliance purposes and dispose of data that is no longer needed to reduce overall liability and compliance risk exposure.

Current migration tools that help tenants move from on-premises archiving solutions to a hosted service, are all-or-nothing solutions. In other words, tenants must migrate all the data over to the hosted service as-is or none at all. This all-or-nothing solution is because tenants have no easy way of understanding their data spectrum and are provided no insights into how to selectively import data to the hosted service. As a result, tenants may end up retaining more data than is actually necessary, raising their compliance risk exposure levels. For example, a tenant organization may continue to retain the personal information of former employees who left the organization long ago. If this data were compromised in a breach, the organization may be liable for costly remediation, such as lifetime credit monitoring for these former employees.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to provide selective import of data to a hosted service through a security and compliance system associated with the hosted service. Data, usage pattern, and security and compliance policies associated with a tenant of the hosted service may be analyzed. A model for importing tenant data may be created based on the analysis. A suggestion may be presented to the tenant based on the model, where the suggestion includes a filter for importing tenant data. In response to receiving a confirmation to implement the suggestion, applying the filter to the tenant data as the tenant data is imported to the hosted service.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
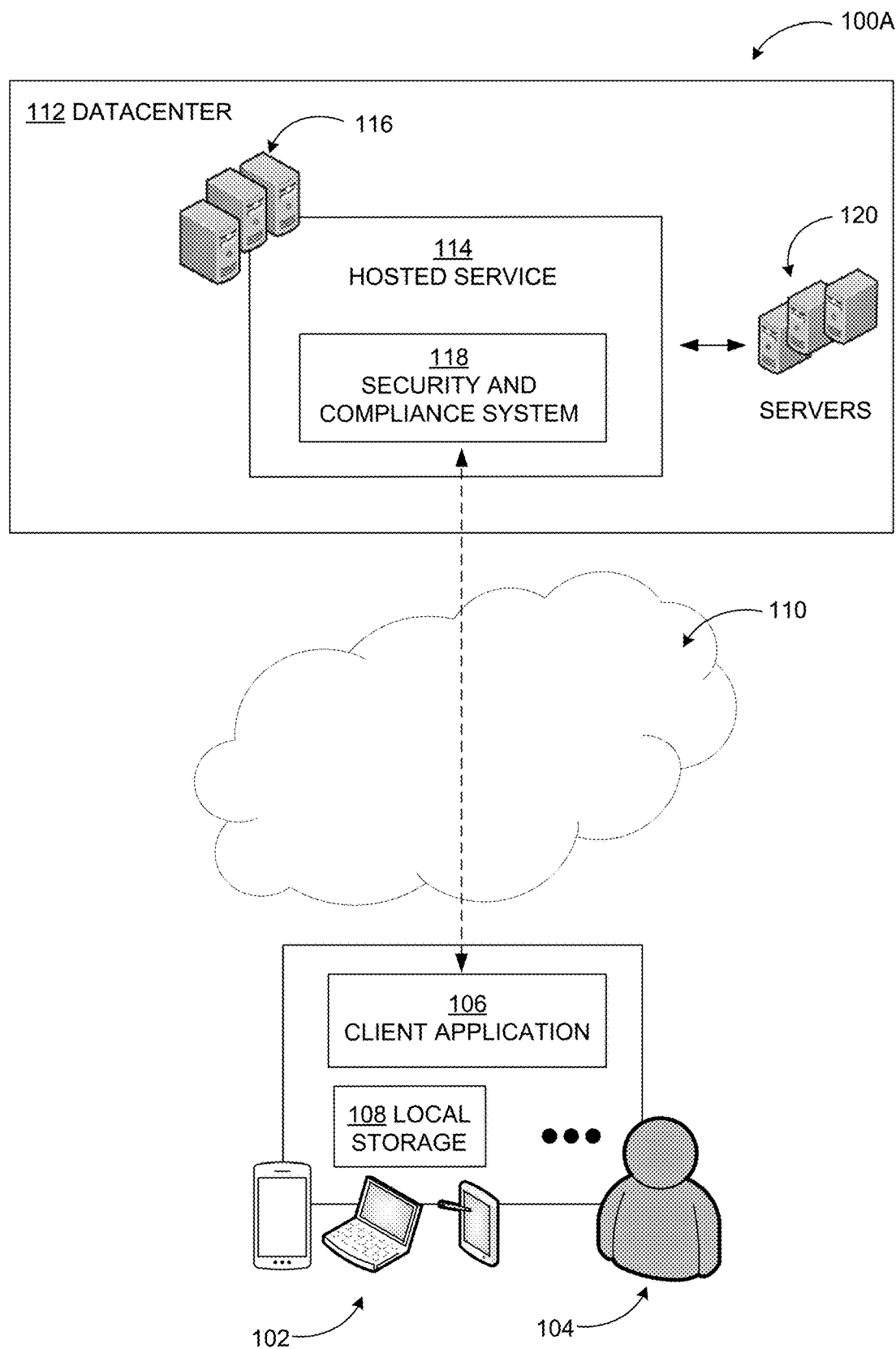
FIGS. 1A through 1C include display diagrams illustrating an example network environment where a system to provide a filter suggestion for selective data import may be implemented.

As briefly described above, embodiments are directed to providing selective import of data to a hosted service through a security and compliance system associated with the hosted service. Data, usage pattern, and security and compliance policies associated with a tenant of the hosted service may be analyzed. A model for importing tenant data may be created based on the analysis, and further tailored based on a tenant profile that includes an industry, a size, a geographical location, a hosted service ecosystem, a role, a regulatory requirement, and/or a legal requirement associated with the tenant. The model may be created by employing machine learning techniques or artificial intelligence (AI), for example.

In one embodiment, a suggestion may be presented to the tenant based on the model, where the suggestion includes a filter for importing tenant data. The filter may be based on age of the tenant data, a type of the tenant data, or a user associated with the tenant data. In response to receiving a confirmation to implement the suggestion, the filter may be applied to the tenant data as the tenant data is imported to the hosted service. In another embodiment, the filter may be automatically selected for importing tenant data and applied to the tenant data as it is imported to the hosted service. In a further embodiment, pre-defined filter options may be provided to the tenant for selection, and the selected filter options may be applied to the tenant data as it is imported to the hosted service. In some examples, the tenant may be provided with an option to customize the suggested filter or pre-defined filter options. The suggested filter or pre-defined filter options and the option to customize may be presented to the tenant through a dashboard associated with the security and compliance system.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing a filter suggestion for selective data import. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
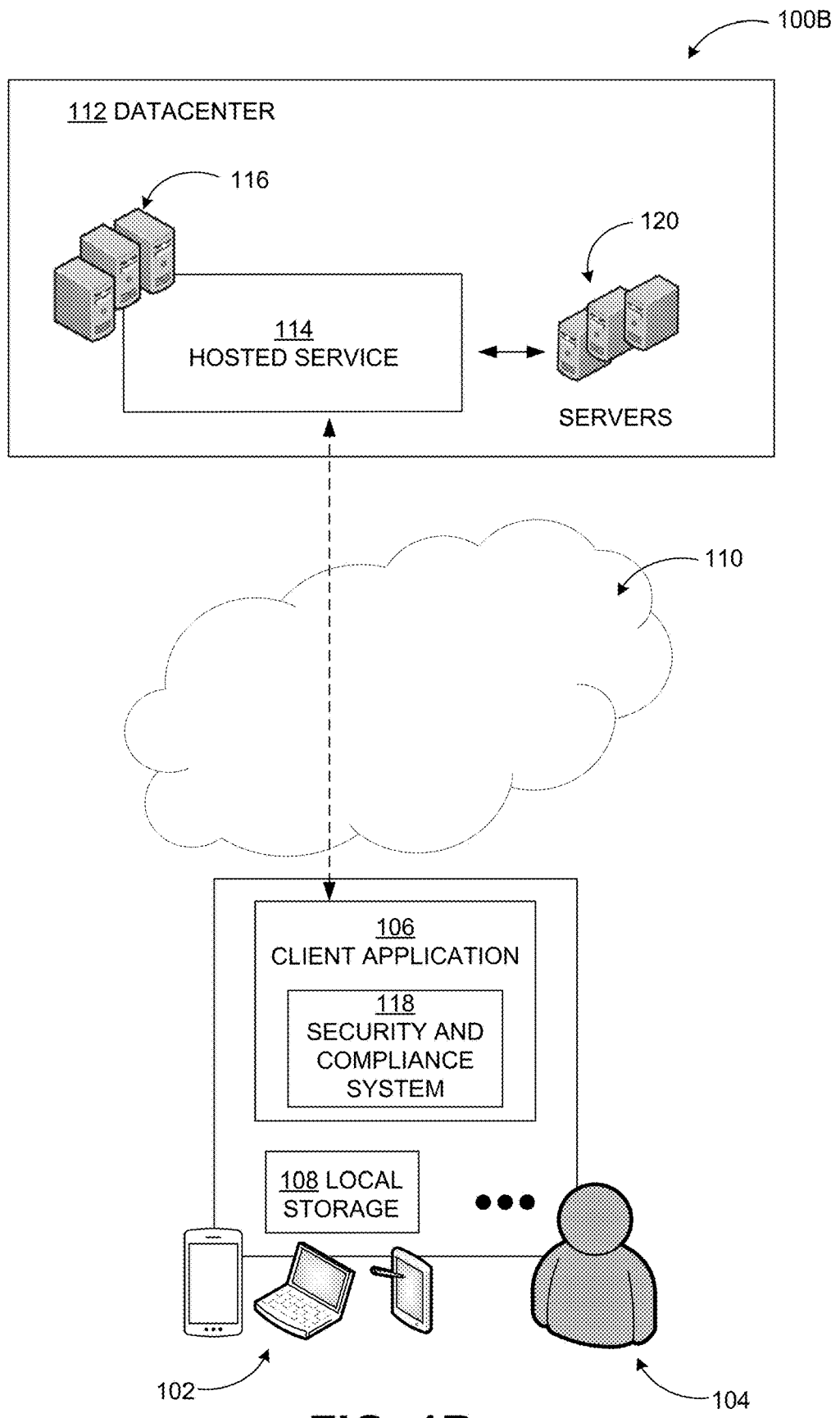
Figure 1C:
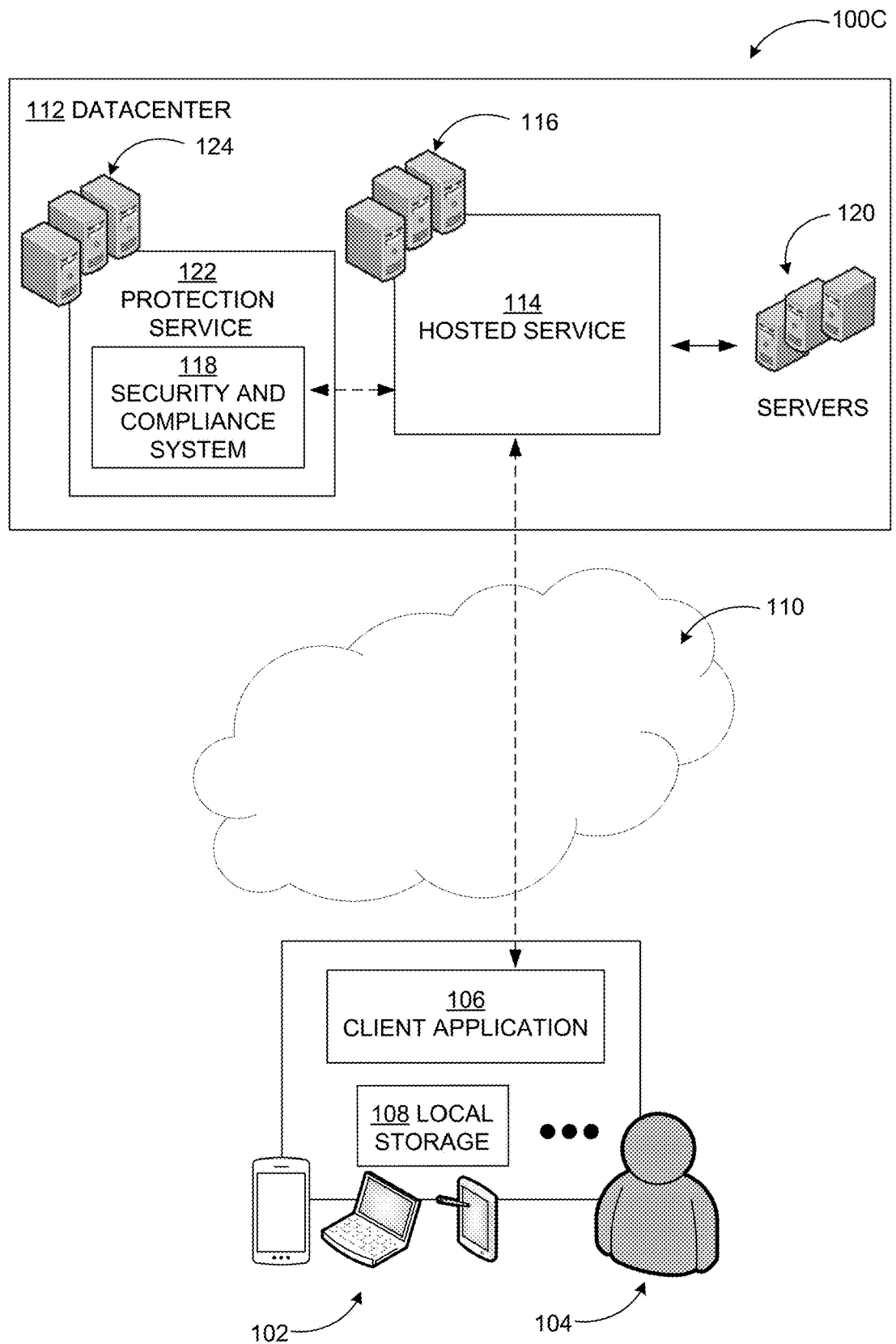

FIG. 1A through 1C include display diagrams illustrating an example network environment where a system to provide a filter suggestion for selective data import may be implemented.

As illustrated in diagrams 100A-100C, an example system may include a datacenter 112 executing a hosted service 114 on at least one processing server 116, which may provide productivity, communication, cloud storage, collaboration, and comparable services to users in conjunction with other servers 120, for example. The hosted service 114 may further include scheduling services, online conferencing services, and comparable ones. The hosted service 114 may be configured to interoperate with a client application 106 through one or more client devices 102 over one or more networks, such as network 110. The client devices 102 may include a desktop computer, a laptop computer, a tablet computer, a vehicle-mount computer, a smart phone, or a wearable computing device, among other similar devices. In some examples, the hosted service 114 may allow users to access its services through the client application 106 executed on the client devices 102. In other examples, the hosted service 114 may be provided to a tenant (e.g., a business, an organization, or similar entities), which may configure and manage the services for their users.

In one embodiment, as illustrated in diagram 100A, the processing server 116 may be operable to execute a security and compliance system 118 of the hosted service 114, where the security and compliance system 118 may be integrated with the hosted service 114. In another embodiment, as illustrated in diagram 100B, the client application 106 may be operable to execute the security and compliance system 118, where the security and compliance system 118 may be integrated with the client application 106. In a further embodiment, as illustrated in diagram 100C, the security and compliance system 118 may be integrated with a separate protection service 122 and executed by one or more processing servers 124 of the protection service 122. The protection service 122 may be configured to serve the hosted service 114 and/or multiple applications associated with the hosted service 114, such as the client application 106. Furthermore, the protection service 122 may provide its services to multiple hosted services. Thus, if a tenant subscribes to multiple hosted services, common information (e.g., analysis results, tenant profiles, data and metadata) may be used to coordinate suggested filters for selective data import to each of the hosted services, among other security and compliance policy suggestions, which reduces the burden on the administrators to have to implement selective importation of data for each hosted service. As described herein, the hosted service 114, the security and compliance system 118, and the protection service 122 may be implemented as software, hardware, or combinations thereof.

The security and compliance system 118 may be configured to manage compliance and protection aspects of the tenant's service environment such as malicious attack mitigation, data management and governance based on legal and regulatory requirements (including data importation), and policy configuration and enforcement. In one scenario, the client application 106 may provide access to a user interface associated with the security and compliance system 118 of the hosted service 114 (or of the protection service 122), such as a dashboard, that may provide summary and/or detailed information associated with threats, data import and management, security and compliance configurations, analyses results, and configuration controls, among other information. A system administrator 104 may interact with the user interface to manage the tenant's security and compliance matters in conjunction with the hosted service 114.

The security and compliance system 118 may be configured to analyze data, usage pattern, and security and compliance policies (e.g., data retention policies, data loss protection policies, etc.) associated with a tenant of the hosted service in order to create a model for importing tenant data based on the analysis. The model may be created by employing machine learning techniques or artificial intelligence (AI), for example. To create the model using machine learning techniques, patterns in the tenant-associated data, usage, and security and compliance policies may be detected. Insights for applicable data filters may be derived from those patterns, and the derived insights may be used to generate a filter suggestion for selective import of the tenant's data to the hosted service 114. To create the model using AI techniques, the tenant's environment may be perceived and applicable filters may be determined based on that perception to maximize the goal of maintaining enough data for compliance purposes while disposing of data that is no longer needed to reduce overall liability and compliance risk exposure. Example machine learning approaches may include, but are not limited to, linear regression, logistic regression, decision tree, various Bayesian algorithms, K-means, neural networks, and random forest. Further artificial intelligence techniques may include, but are not limited to, case-based reasoning, rule-based systems, artificial neural networks, genetic algorithms, cellular automata, fuzzy models, multi-agent systems, swarm intelligence, reinforcement learning and hybrid systems. The model may also be tailored based on a profile of the tenant, where the profile includes an industry, a size, a geographical location, a hosted service ecosystem, a role, a regulatory requirement, and/or a legal requirement associated with the tenant. For example, the tenant may be a U.S. insurance company affiliated with the medical industry. The tenant's industry has particular regulatory and legal requirements for storage of data that must be complied with. Therefore, the model may be tailored in light of the industry's regulatory and legal requirements to ensure that filter suggestions are such that data compliance will be met while also limiting the amount of unnecessary data to reduce overall liability and compliance risk exposure. Additionally, if the tenant data already has an existing data classification system in place (e.g., high business impact, moderate business impact, low business impact), the model may include and/or modify these classifications.

In one embodiment, the security and compliance system 118 may present a suggestion to the tenant through the dashboard, where the suggestion is based on the model and includes a filter for importing tenant data. The filter may be based on age of the tenant data, a type of the tenant data, or a user associated with the tenant data. In response to receiving a confirmation to implement the suggestion, the filter may be applied to the tenant data as the tenant data is imported to the hosted service. The tenant data to which the filter is applied may include documents, files, and communications, such as emails, messages, online conferences, and recordings. In some examples, the security and compliance system 118 may provide the tenant with an option to customize the suggested filter through the dashboard. Customization may include modification of the suggested filter, addition of one or more filters, such as sensitive data or junk data filters, or deletion of the suggested filter.

In another embodiment, no suggestion may be provided, and instead the filter may be automatically selected for importing tenant data based on the model and applied to the tenant data as it is imported to the hosted service. In a further embodiment, instead of using the model, pre-defined filter options may be provided to the tenant for selection, and the tenant-selected filter options may be applied to the tenant data as it is imported to the hosted service. The pre-defined filter options may be similar to the types of information used by the model to suggest or automatically select a filter. For example, the pre-defined filter options may include an industry of the tenant, a geographical location of the tenant, a size of the tenant, an age of the tenant data, a type of the tenant data, a user associated with the tenant data, and specific types of sensitive information within the tenant data, among other examples.

In some examples, the security and compliance system 118 may be configured to monitor importation of the tenant data in accordance with the filter, and create a compliance report based on the monitoring. The security and compliance system 118 may then be configured to analyze and determine updates for the filter based on the compliance report. For example, if the compliance report indicates more data than is necessary is still being imported to the hosted service, an additional filter may be included in the update that will still ensure compliance while removing the unnecessary data. This analysis will be incorporated into the model and these updates may be presented as further suggestions to the tenant through the dashboard or automatically applied to the filter. The implemented/selected suggestion, pre-defined filter options, and/or updates may be stored remotely in a data store associated with the hosted service 114 or protection service 122 (for example, at a storage server within the other servers 120) and/or locally on the client devices 102 (for example, at local storage 108) associated with the administrator 104.

As previously discussed, when migrating data from on-premises archiving solutions to a hosted service, tenants should maintain just enough data for compliance purposes and dispose of data that is no longer needed to reduce overall liability and compliance risk exposure. However, current migration tools that help tenants move from on-premises archiving solutions to a hosted service, are all-or-nothing solutions, where the tenants must migrate all the data over to the hosted service as-is or none at all. As a result, tenants end up retaining more data than is actually necessary. Embodiments, as described herein, are directed towards providing selective import of data to a hosted service through a security and compliance system associated with the hosted service in order to reduce overall liability and compliance risk exposure. By creating a model based on analysis of data, usage, and security and compliance policies and tailoring it for the tenant, insights on how to most efficiently migrate data such that regulatory and legal requirements are met, while maintaining the least amount of data can be derived and suggested to the tenant. This not only serves compliance purposes but also reduces the amount of processing and storage needs as only necessary data is imported. Additionally, the presentation of filter suggestions and customization options through the dashboard improve interactivity between the tenant administrator and the security and compliance system.

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large numbers of devices and users using hosted services.

Figure 2:
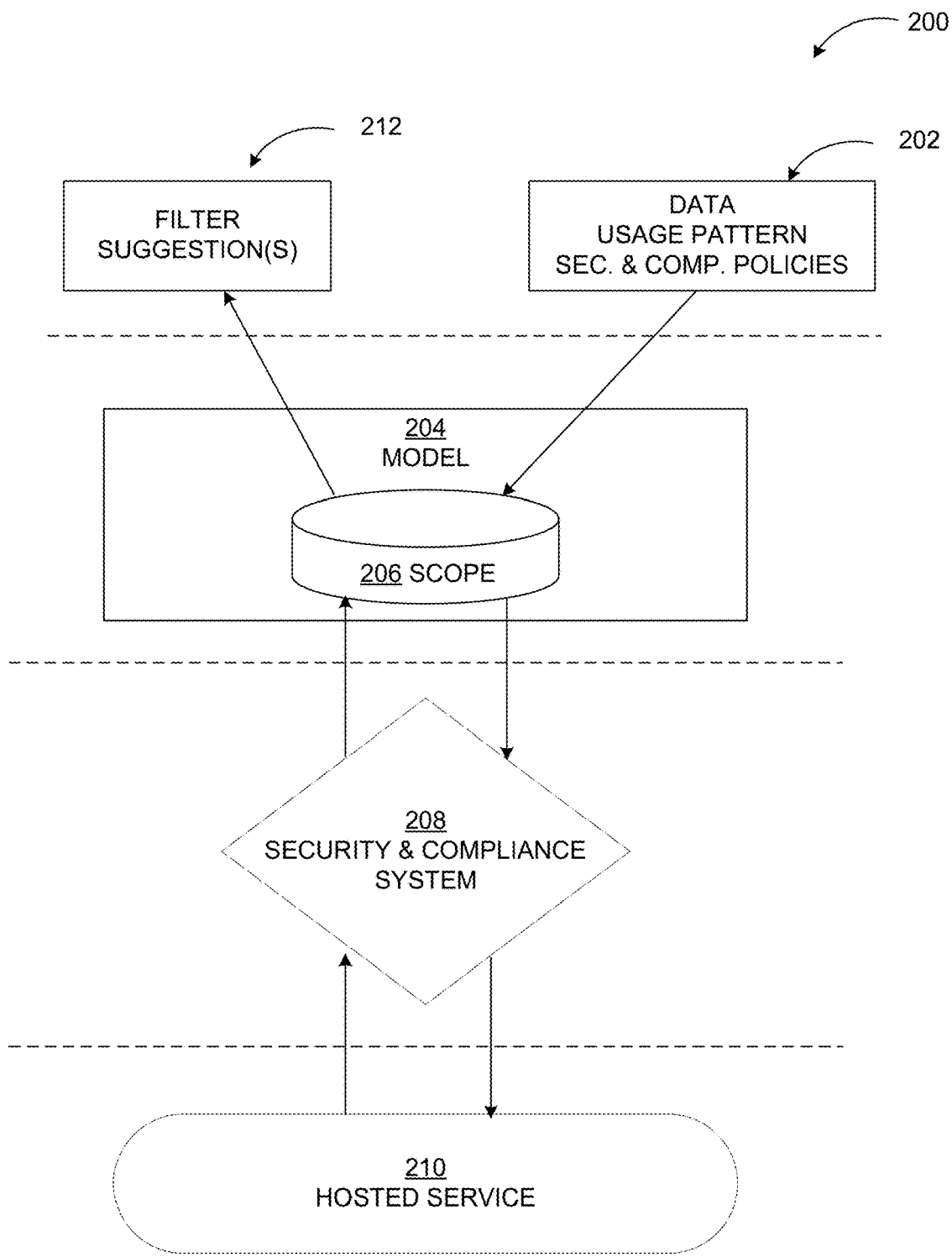
FIG. 2 includes a display diagram illustrating an example architecture of a system to use data input from a tenant of a hosted service to provide a filter suggestion for selective data import to the hosted service.

FIG. 2 includes a display diagram illustrating an example architecture of a system to use data input from a tenant of a hosted service to provide a filter suggestion for selective data import to the hosted service.

As shown in a diagram 200, a hosted service 210 may include a security and compliance system 208 associated with compliance and protection aspects of a tenant's organization, such as malicious attack mitigation, data import, management, and protection, and policy configuration and enforcement, for example.

The security and compliance system 208 may create a model 204 based on an analysis of tenant-associated data, usage pattern, and security and compliance policies 202. Examples of the security and compliance policies may include data retention policies, and data loss protection policies already implemented by the tenant, among other similar policies. The model 204 may derive a scope 206 of filter suggestions 212 using machine learning techniques and/or AI. The security and compliance system 208 may interface with the hosted service 210 in order to obtain additional data and/or profiles, such as a tenant profile to further tailor the filter suggestions 212. The hosted service 210 may include backend storage systems, such as tenant storage and general storage, from which the additional data and/or profiles may be retrieved. The security and compliance system 208 may then be configured present the filter suggestions 212, customized based on the scope 206, to the tenant.

Figure 3:
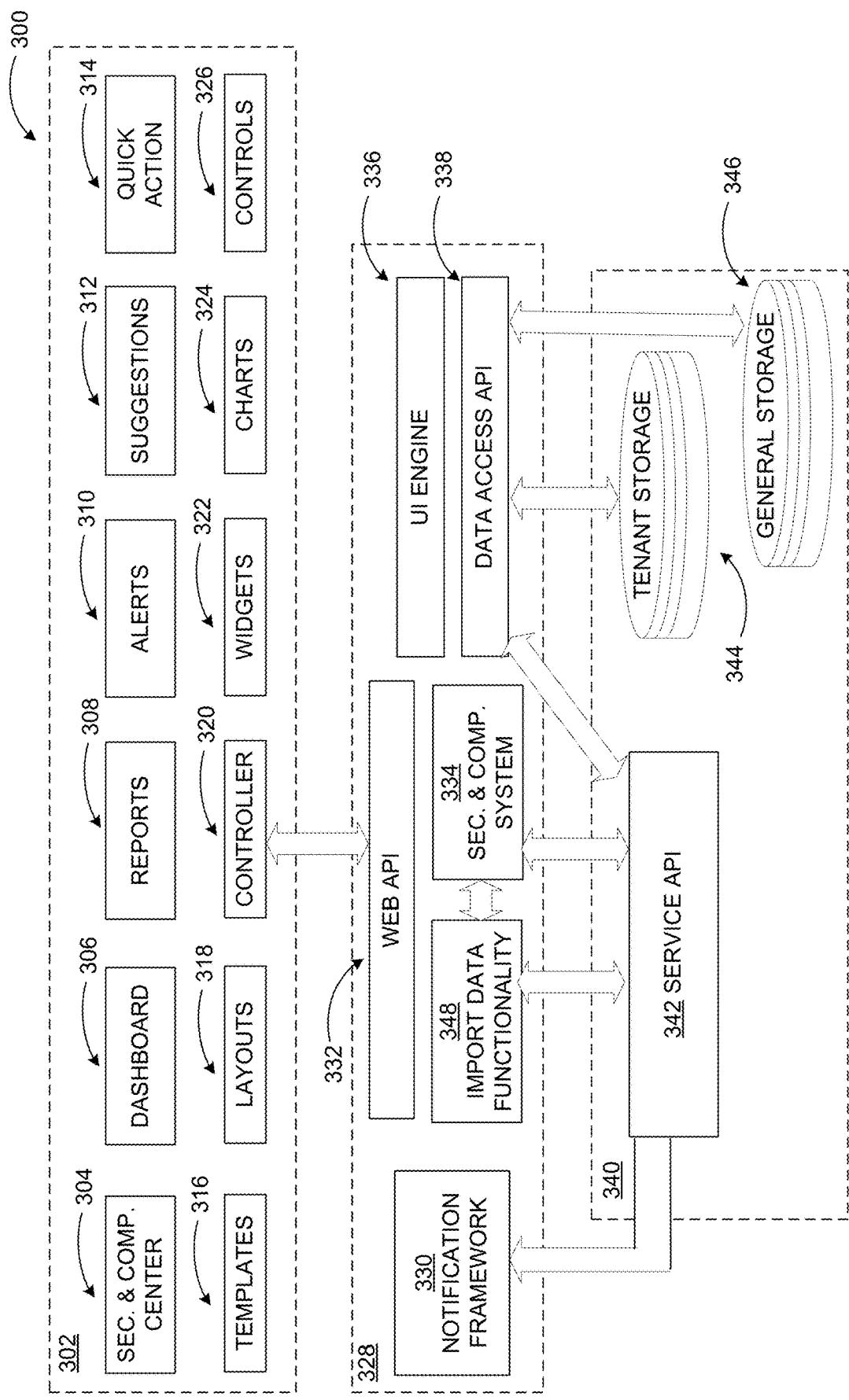
FIG. 3 includes a display diagram illustrating an example architecture of a system to provide a filter suggestion for selective data import to a hosted service.

FIG. 3 includes a display diagram illustrating an example architecture of a system to provide a filter suggestion for selective data import to a hosted service.

In some examples, a hosted service may allow tenant administrators access to its services through a client application 302. As shown in a diagram 300, the client application 302 may display a user interface enabling a tenant administrator to interact with a security and compliance center 304 associated with protection aspects of a tenant's organization, such as malicious attack mitigation, data import, management, and protection, and policy configuration and enforcement, for example. The user interface may be a dashboard 306, where data input from the dashboard 306 may be used to provide customized suggestions 312 for display through the dashboard 306. The suggestions 312 may include filter suggestions for importation of data into the hosted service. The suggestions 312 may also include other security and compliance policy suggestions such as a policy, a configuration, a policy customization, or a configuration customization to retain or protect data, for example. The dashboard 306 may also provide reports 308, alerts 310, and quick action options 314 with which the tenant administrator may interact. The dashboard 306 may have attributes such as templates 316, layouts 318, widgets 322, charts 324 and controls 326 that may be customized.

A dashboard controller 320 may interface with a server 328 through a web application programming interface (API) 332. Calls may be sent back and forth from the server 328 to the client application 302 based on what should be displayed through the dashboard 306. For example, a security and compliance system 334 may generate the suggestions 312 and a call may sent through the web API 332 to display the suggestions 312 through the dashboard 306 in a manner determined by the user interface (UI) engine 336. The security and compliance system 334 may interface with a data import functionality 348 of the server 328 to apply filter suggestions, for example, to tenant data as the tenant data is being imported to the hosted service. The server 328 may host a notification framework 330 configured to determine tenant administrators to be notified of the suggestions 312, alerts 310, and reports 308, among other examples, and how those notifications should be delivered.

A data access API 338 hosted by the server 328 may interface with backend storage systems 340. The backend storage systems 340 may include tenant storage 344 and general storage 346, for example. The backend storage systems 340 may also include a service API 342 that interfaces with the security and compliance system 334, the notification framework 330, and data that is being retrieved by the data access API 338 from the tenant storage 344 and general storage 346 to allow exchange.

Figure 4:
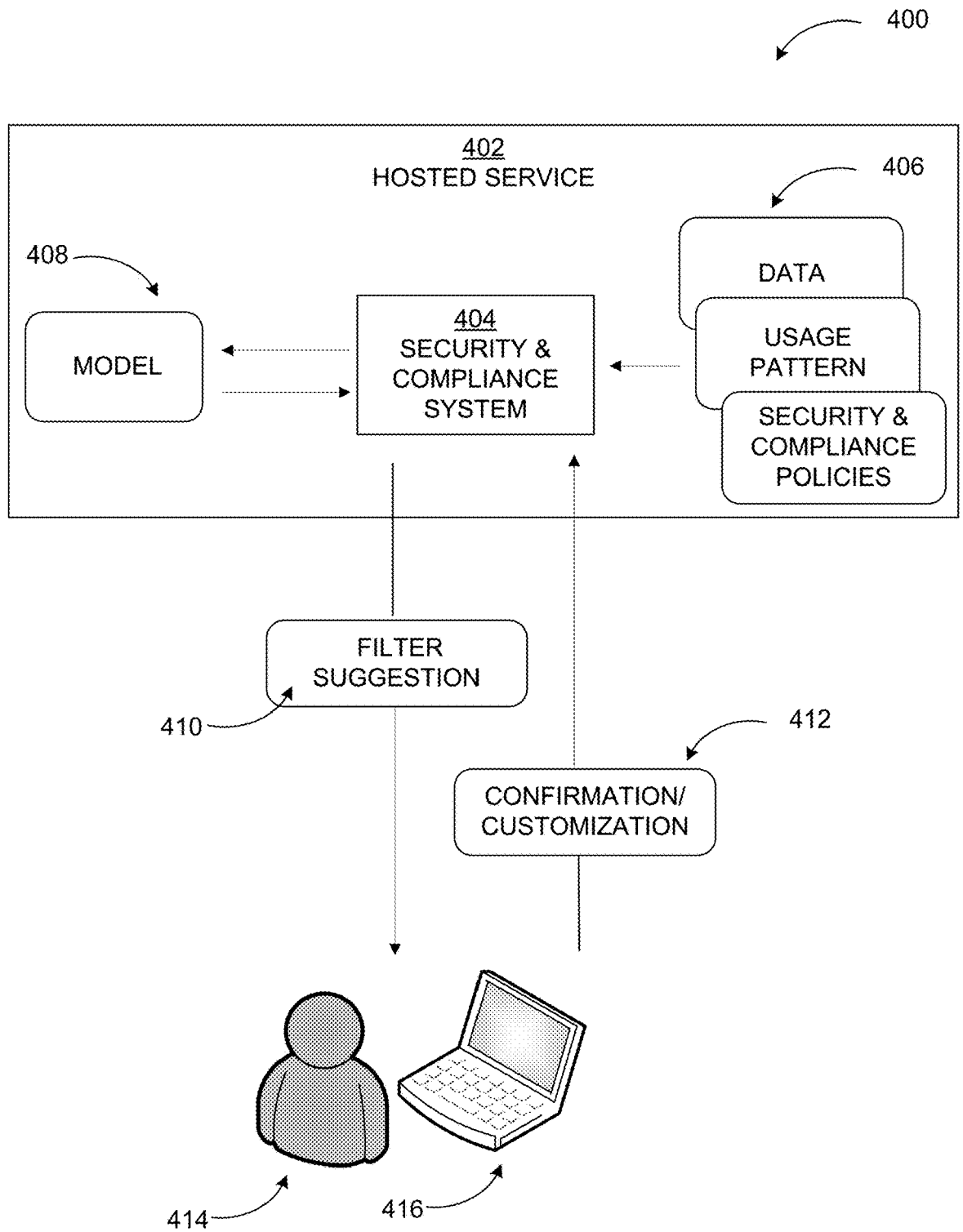
FIG. 4 includes a display diagram illustrating conceptually an example set of actions and components for providing a filter suggestion for selective data import to a hosted service.

FIG. 4 includes a display diagram illustrating conceptually an example set of actions and components to provide a filter suggestion for selective data import.

As shown in diagram 400, a hosted service 402 may include a security and compliance system 404. The security and compliance system 404 may analyze data, usage pattern, and security and compliance policies 406 associated with a tenant of the hosted service 402 to create a model 408, where a filter suggestion 410 for selective import of the tenant's data to the hosted service 402 may be determined based on the model 408. In one embodiment, the model may be created employing machine learning techniques. For example, the data, usage pattern, and security and compliance policies 406 may be analyzed to detect patterns in order to derive insights for applicable filters based on the patterns. The derived insights may be used to determine the filter suggestion 410 for selective import of the tenant's data to the hosted service 402 in order to reduce overall liability and compliance risk exposure created when too much unnecessary data is imported. In another embodiment, the model may be created employing AI techniques such as case-based reasoning, rule-based systems, artificial neural networks, genetic algorithms, cellular automata, fuzzy models, multi-agent systems, swarm intelligence, reinforcement learning and hybrid systems, where the tenant's environment may be perceived and applicable filters may be determined based on that perception to maximize the goal of maintaining enough data for compliance purposes while disposing of data that is no longer needed to reduce overall liability and compliance risk exposure. For example, the model 408 may be further tailored based on a profile of the tenant, where the profile includes an industry, a size, a geographical location, a hosted service ecosystem, a role, a regulatory requirement, and/or a legal requirement associated with the tenant using the hosted service 402.

The filter suggestion 410 may be based on an age of the tenant data, a type of the tenant data, and/or a user associated with the tenant data. For example, the tenant organization may have an internal and/or industry-regulated policy for data retention (e.g., 1 year) and thus the age of the tenant data may be suggested such that compliance with that policy is met without having to retain additional unnecessary data. In another example, the tenant organization may only be required to retain certain types of data for specified periods of time, such as internal and external communications (emails, messages, online conferences, and recordings), whereas other files and documents need not be saved for longer than they are needed. In a further example, if the tenant is a business organization comprising hundreds of employees both former and present, the filter suggestion may include to remove tenant data associated with users that are no longer employed. If the organization continues to retain the personal information of former employees who left the organization long ago and this data were compromised in a breach, the organization could be liable for costly remediation, such as lifetime credit monitoring for these former employees.

Additional filters may include sensitive data filters and junk data filters. The sensitive data filters may be based on specific types of sensitive data (e.g., social security numbers, credit card numbers, or bank account numbers) or may be based on sensitive data generally such that all data comprising sensitive data is imported. The junk data filters may be based on a user or a subject associated with the data.

A client application associated with the hosted service 402 and executing on a client device 416 may provide a tenant administrator 414 access to a user interface, such as a dashboard, associated with the security and compliance system 404. In one embodiment, the filter suggestion 410 may be presented to the tenant administrator 414 through the dashboard with an option to confirm implementation of the suggestion and/or to customize the filter(s). In response to receiving confirmation/customization 412, the security and compliance system 404 may be configured to apply the filter(s) as suggested to the tenant data as it is imported to the hosted service 402. In another embodiment, the filter(s) as suggested may be implemented automatically and applied to the tenant data as it is being imported to the hosted service 402. Any customizations made by the tenant administrator 414 may be used to update the model 408.

Figure 5A:
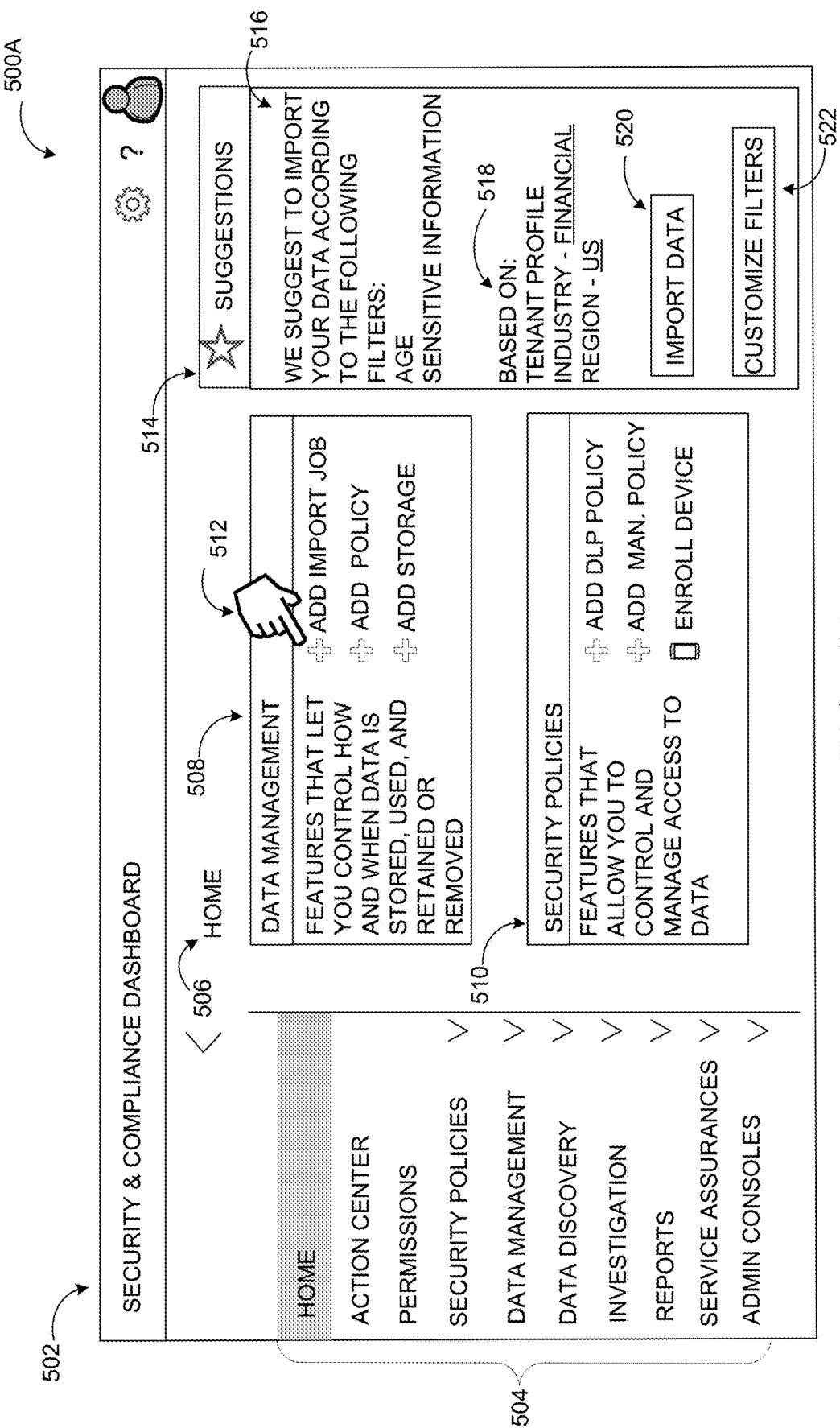
FIGS. 5A and 5B include display diagrams illustrating an example dashboard through which a filter suggestion and/or pre-defined filter options may be presented for tenant selection.
Figure 5B:
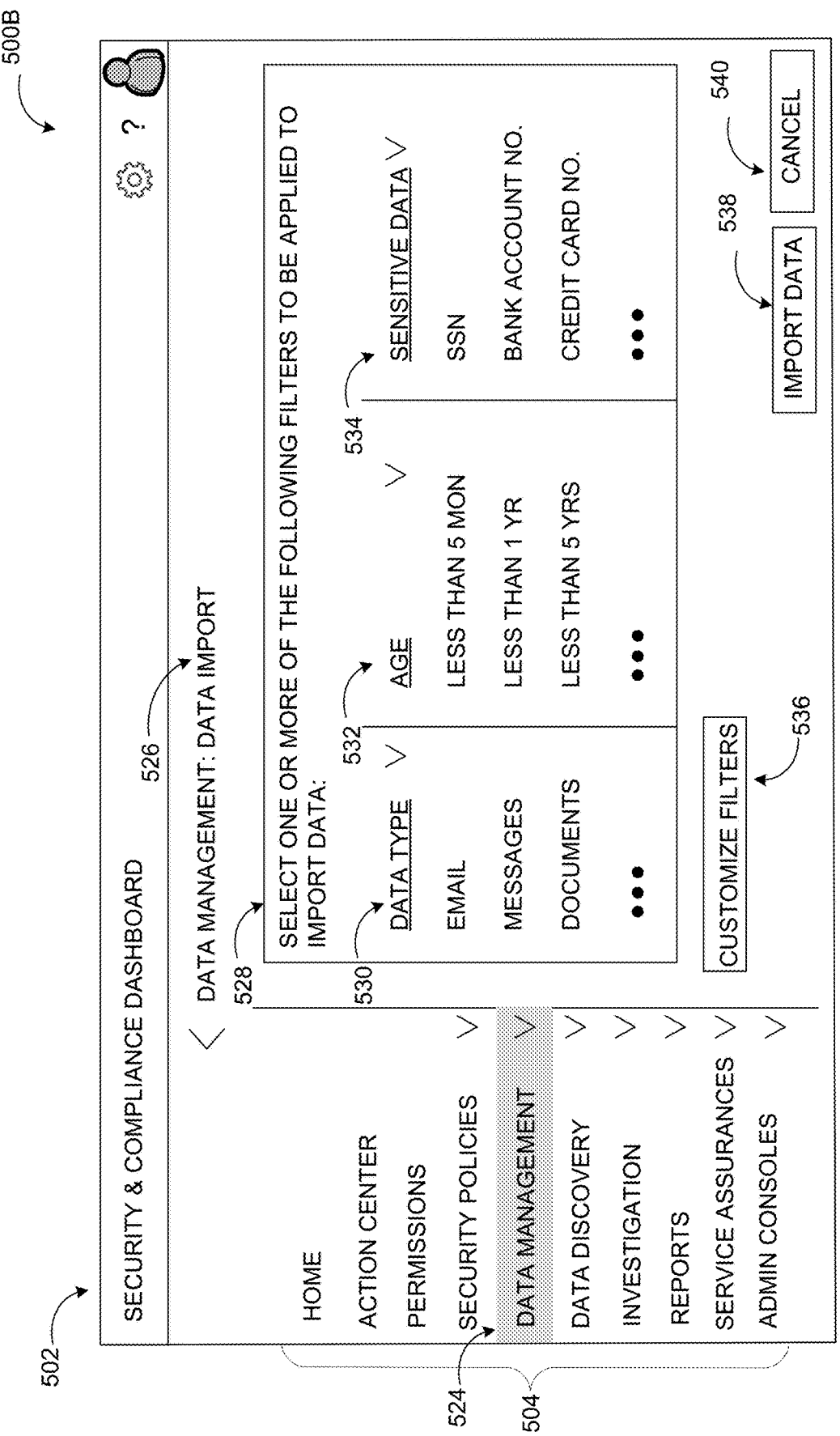

FIGS. 5A and 5B include display diagrams illustrating an example dashboard through which a filter suggestion and/or pre-defined filter options may be presented for tenant selection.

As shown in diagrams 500A of FIG. 5A and 500B of FIG. 5B, a client application may provide a tenant administrator, for example, access to a user interface, such as a dashboard 502, associated with a security and compliance system of a hosted service or a separate protection service. The dashboard 502 may present summary and/or detailed information associated with threats, data import, data management, data protection, security and compliance configurations, analyses results, and configuration controls, for example. Among other things, the dashboard 502 may comprise a plurality of tabs 504 that each offer one or more security and compliance-based features that may be managed by the tenant administrator through the dashboard 502. Example tabs 504 may include a home dashboard view 506, an action center, permissions, security policies, data management, data discovery, investigation, reports, service assurances, and administrative consoles.

As shown in a diagram 500A, the home dashboard view 506 may enable the tenant administrator to quickly create, enable, or manage data 508 and security policies 510. Additionally, the home dashboard view 506 may display a suggestion user interface element 514 that includes one or more suggestions associated with offered security and compliance features. In some examples, an icon, such as a star, may be associated with the suggestion user interface element 514 to indicate that a new suggestion is available since the last time the dashboard 502 was viewed.

In an example scenario, the tenant may be migrating data from an off-premises archiving solution to the hosted service. Therefore, the tenant administrator may select to add an import job 512 to import the data to the hosted service. In one embodiment, in response to the selection of the import job 512, the suggestion user interface element 514 may convey a filter suggestion 516 to selectively import data to the hosted serve in order to reduce overall liability and compliance risk exposure. For example, the filter suggestion may be to filter the tenant data according to an age of the tenant data and based on sensitive information contained within the tenant data. The filter suggestion 516 may be based on a model created by the security and compliance system by analyzing data, usage pattern, and security and compliance policies associated with the tenant. The model may be further tailored based on a profile of the tenant, where the profile includes an industry, a size, a geographical location, a hosted service ecosystem, a role, a regulatory requirement, and/or a legal requirement associated with the tenant using the hosted service.

The suggestion user interface element 514 may also display particular data from the model on which the filter suggestion is based 518. For example, the filter suggestion 516 may be based on a tenant's affiliation with the financial industry and its location within the United States, which may require certain age-based retention policies for certain types of data containing sensitive information, like bank account numbers. The suggestion user interface element 514 may further include a selectable option to import data 520 according to the filter suggestion 516 (i.e., apply the age and sensitive information filters to the tenant data as it is being imported to the hosted service), or a selectable option to customize the filters 522 provided in the filter suggestion 516. Customization may include modification of the suggested filters, addition of one or more filters, or deletion of one or more of the suggested filters. The customization view provided to the tenant administrator may look similar to the data import view described in detail in diagram 500B below. Any customizations made by the tenant administrator may be used to update the model.

In another embodiment, if the tenant administrator selects to add an import job 512, the tenant administrator may be navigated to a data import view 526 associated with a data management tab 524 within the tabs 504 of the dashboard 502, as shown in diagram 500B. The data import view 526 may present a prompt and pre-defined filter options 528 to the tenant administrator for selection and application to the tenant data as it is it being imported to the hosted service. The pre-defined filter options 528 may be similar to the types of information used by the model to automatically determine the filter suggestion. For example, the pre-defined filter options may include an industry of the tenant, a geographical location of the tenant, a size of the tenant, an age of the tenant data 532, a type of the tenant data 530, a user associated with the tenant data, and specific types of sensitive information within the tenant data 534, among other examples. The import data view may also present a selectable option to customize the filters 536 that are provided as pre-defined filter options 528. Customization may include modification of the filter options, addition of one or more filter options, or deletion of one or more of the filter options. Once selections of desired pre-defined filter options 528 have been made and/or customizations completed, the tenant administrator may select to import data 538 accordingly or cancel the import job 540.

The dashboard 502 is not limited to the above described components and features. Various graphical, textual, coloring, shading, and visual effect schemes may be employed to present suggested policies and/or policy configuration options through a dashboard.

The examples provided in FIGS. 1A through 5B are illustrated with specific systems, services, applications, and user interface displays. Embodiments are not limited to environments according to these examples. Filter suggestions for selective data import may be implemented in environments employing fewer or additional systems, services, applications, and user interface displays. Furthermore, the example systems, services, applications, and user interface displays shown in FIG. 1A through 5B may be implemented in a similar manner with other user interface or action flow sequences using the principles described herein.

Figure 6:
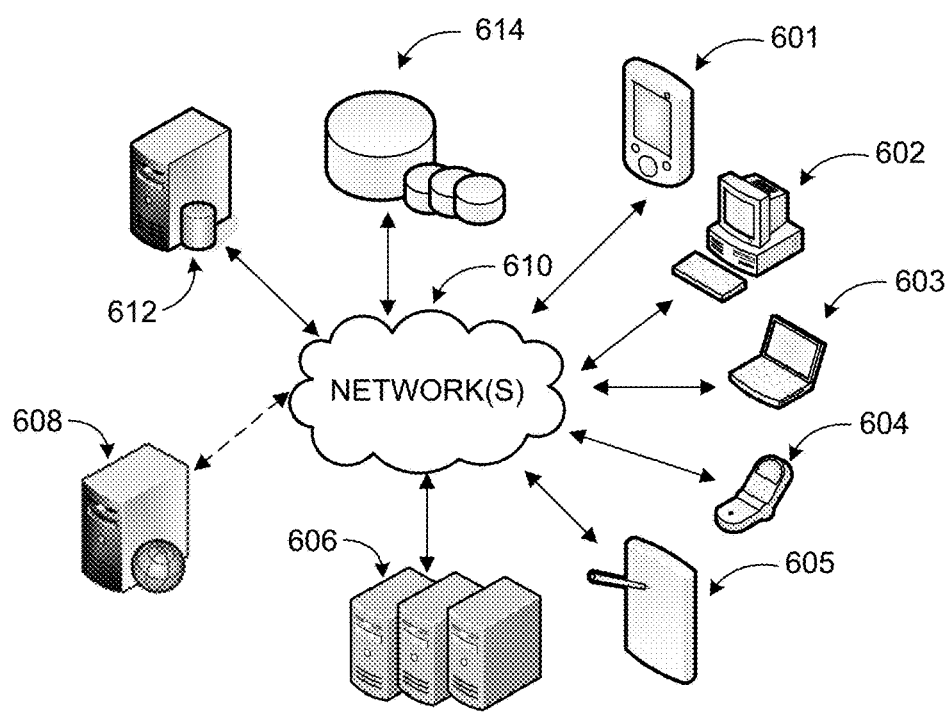
FIG. 6 is a networked environment, where a system according to embodiments may be implemented.

FIG. 6 is a networked environment, where a system according to embodiments may be implemented. A security and compliance system as described herein may be employed in conjunction with hosted applications and services (for example, the client application 106 associated with the hosted service 114, the hosted service 114, or the protection service 122) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface, such as a dashboard, presented to users.

Client devices 601-605 are used to access the functionality provided by the hosted service or client application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed to provide a filter suggestion for selective data import. Furthermore, the networked environments discussed in FIG. 6 are for illustration purposes only. Embodiments are not limited to the example applications, engines, or processes.

Figure 7:
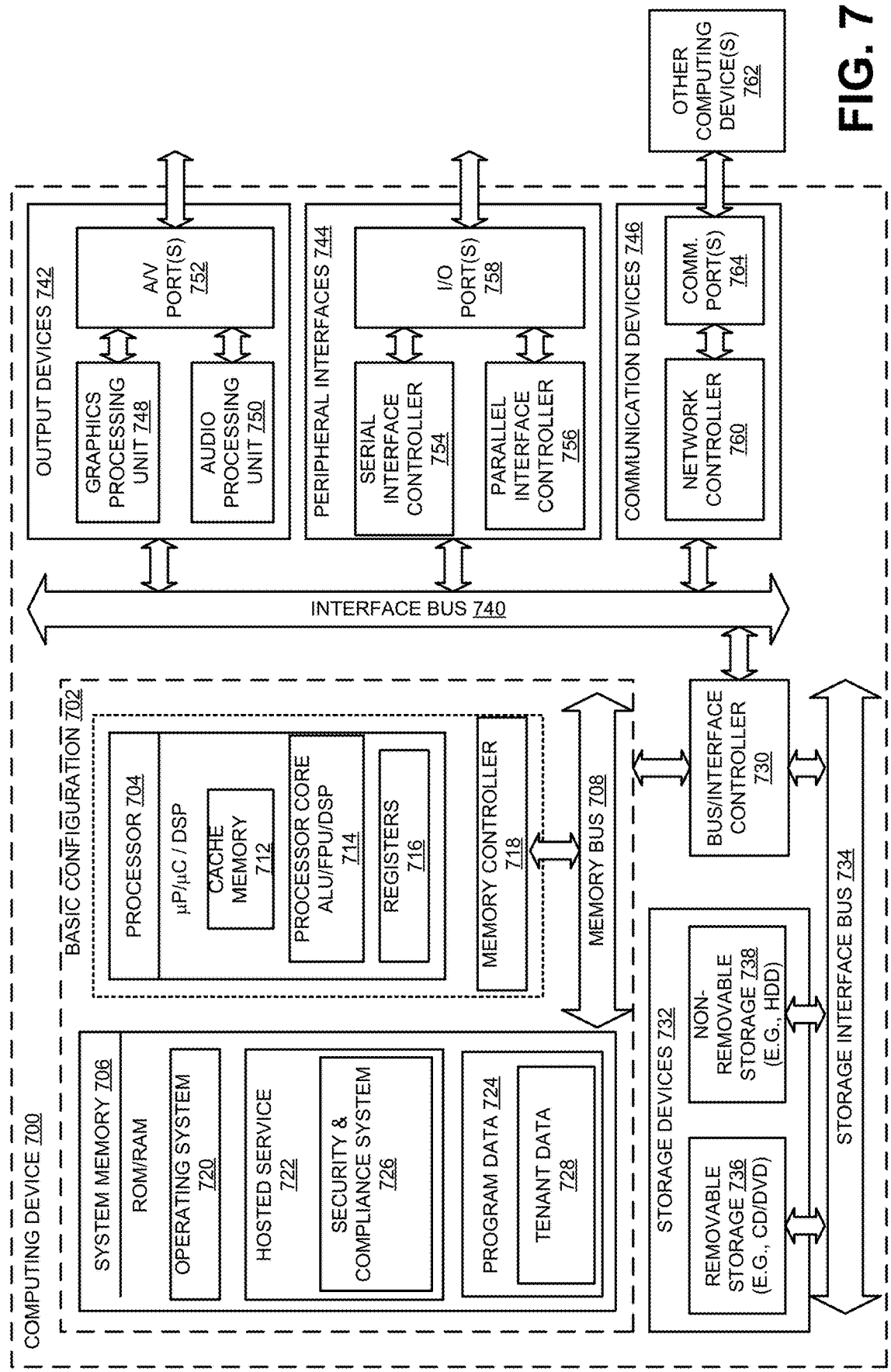
FIG. 7 is a block diagram of an example computing device, which may be used to provide a filter suggestion for selective data import to a hosted service.

FIG. 7 is a block diagram of an example a computing device, which may be used to provide a filter suggestion for selective data import.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a hosted service 722, and program data 724. The hosted service 722 may include a security and compliance system 726, which may be an integrated module of the hosted service 722. The security and compliance system 726 may be configured to analyze data, usage pattern, and security and compliance policies associated with a tenant of the hosted service 722 to create a model for importing tenant data and present a suggestion that includes filter(s) for importing the tenant data to the hosted service 722 based on the model. In response to receiving a confirmation to implement the suggestion or a customization of the suggested filter, the security and compliance system 726 may be configured to apply the suggested or customized filter to the tenant data as it is imported to the hosted service 722. The program data 724 may include, among other data, tenant data 728, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide a filter suggestion for selective data import. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
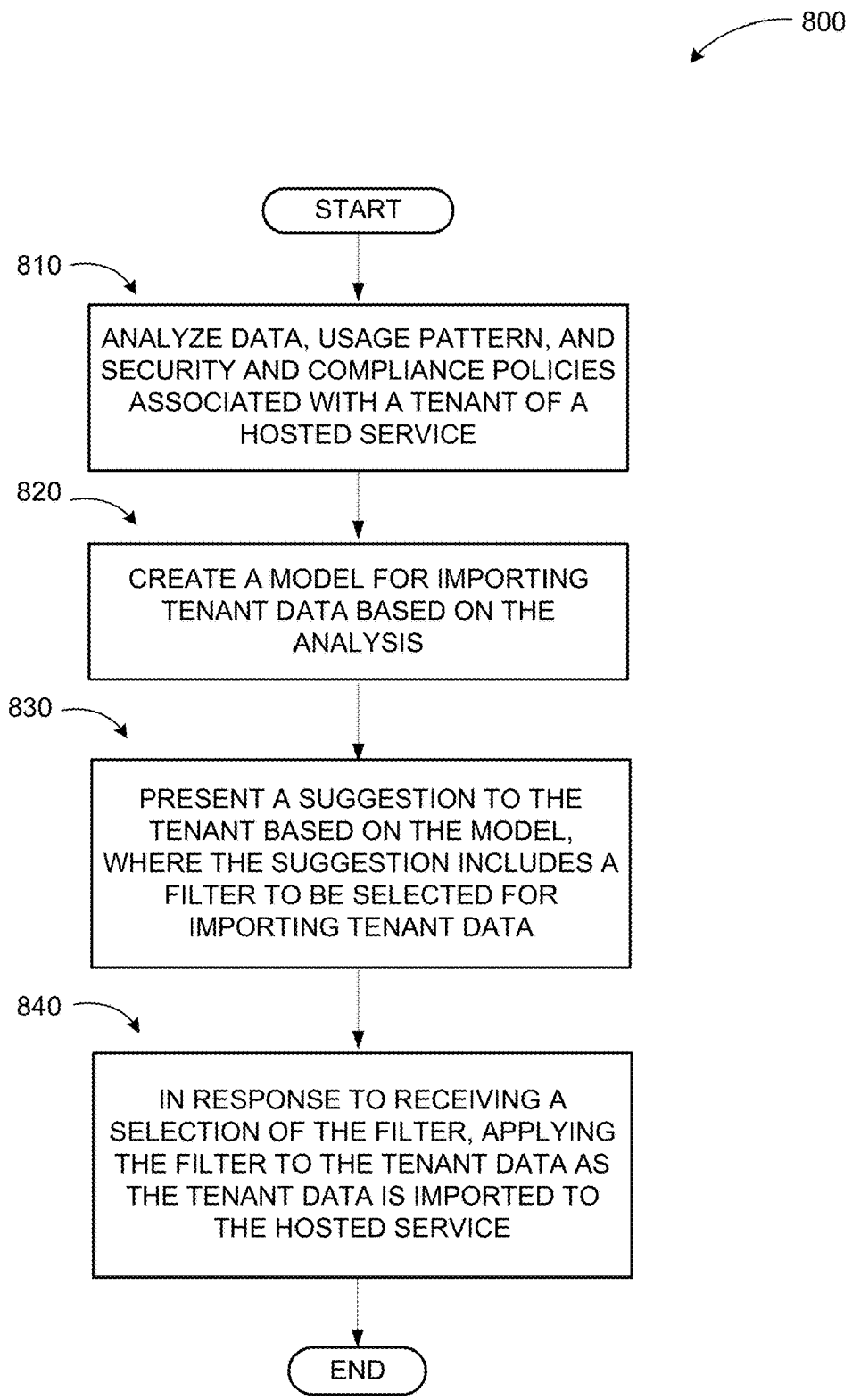
FIG. 8 illustrates a logic flow diagram of a method to provide a filter suggestion for selective data import to a hosted service, arranged in accordance with at least some embodiments described herein.

FIG. 8 illustrates a logic flow diagram of a method to provide a filter suggestion for selective data import. Process 800 may be implemented on a computing device, server, or other system. An example server configured to execute a security and compliance system associated with a service may comprise a communication interface to facilitate communication between one or more client devices and another server configured to host the service for a tenant and one or more users. The example server may also comprise a memory to store instructions, and one or more processors coupled to the memory. The processors, in conjunction with the instructions stored on the memory, may be configured to provide filter suggestions for selective data import.

Process 800 begins with operation 810, where the processors may be configured to analyze data, usage pattern, and security and compliance policies associated with a tenant of the hosted service, where a model for importing tenant data may be created based on the analysis at operation 820. The model may be created by employing machine learning techniques or artificial intelligence (AI), for example. The model may be further tailored based on a tenant profile that includes an industry, a size, a geographical location, a hosted service ecosystem, a role, a regulatory requirement, and/or a legal requirement associated with the tenant.

At operation 830, a suggestion may be presented to the tenant based on the model, where the suggestion includes a filter for importing tenant data. The filter may be based on age of the tenant data, a type of the tenant data, or a user associated with the tenant data. Additional filters may include sensitive data filters and junk data filters. At operation 840, in response to receiving a confirmation to implement the suggestion, the filter may be applied to the tenant data as the tenant data is imported to the hosted service. In some examples, the tenant may be provided with an option to customize the filter. The filter and the option to customize the filter may be presented to the tenant through a dashboard associated with the security and compliance system.

The operations included in process 800 are for illustration purposes. Filter suggestions for selective data import may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing selective import of data to a hosted service through a security and compliance system associated with the hosted service is described. The means may include a means for analyzing data, usage pattern, and security and compliance policies associated with a tenant of the hosted service; a means for creating a model for importing tenant data based on the analysis; a means for tailoring the model based on a profile of the tenant, where the profile includes one or more of an industry, a size, a geographical location, a hosted service ecosystem, a role, a regulatory requirement, and a legal requirement associated with the tenant; a means for presenting a suggestion to the tenant based on the model through a dashboard associated with the security and compliance system, where the suggestion includes a filter for importing tenant data; and a means for applying the filter to the tenant data as the tenant data is imported to the hosted service in response to receiving a confirmation to implement the suggestion.

According to some examples, a method to provide selective import of data to a hosted service through a security and compliance system associated with the hosted service is described. The method may include analyzing data, usage pattern, and security and compliance policies associated with a tenant of the hosted service; creating a model for importing tenant data based on the analysis; tailoring the model based on a profile of the tenant, where the profile includes one or more of an industry, a size, a geographical location, a hosted service ecosystem, a role, a regulatory requirement, and a legal requirement associated with the tenant; presenting a suggestion to the tenant based on the model through a dashboard associated with the security and compliance system, where the suggestion includes a filter for importing tenant data; and in response to receiving a confirmation to implement the suggestion, applying the filter to the tenant data as the tenant data is imported to the hosted service.

According to other examples, the method may also include automatically selecting the filter to be applied to the tenant data based on the model; and applying the selected filter to the tenant data as the tenant data is imported to the hosted service. The method may further include presenting pre-defined filter options to the tenant for selection through a dashboard associated with the security and compliance system; and applying the selected pre-defined filter options to the tenant data as the tenant data is imported to the hosted service. The method may also include presenting an option to customize the filter to the tenant through a dashboard associated with the security and compliance system; and in response to detecting a customization of the filter by the tenant, adjusting the model based on the customization.

According to further examples, the method may further include monitoring importation of the tenant data in accordance with the filter; creating a compliance report based on the monitoring; analyzing and determining modifications for the filter based on the compliance report; and/or adjusting the model based on the determined modifications. Creating the model for importing tenant data based on the analysis may include employing machine learning or artificial intelligence (AI) to create the model.

According to other examples, a server configured to provide selective import of data to a service through a security and compliance system associated with the service is described. The server may include a communication interface configured to facilitate communication between another server hosting the service for a tenant, one or more client devices, and the server; a memory configured to store instructions; and one or more processors coupled to the communication interface and the memory. The processors may be configured to analyze data, usage pattern, and security and compliance policies associated with the tenant; create a model for importing tenant data based on the analysis; present a suggestion to the tenant based on the model through a dashboard associated with the security and compliance system, where the suggestion includes a filter to be selected for importing tenant data; and in response to receiving a confirmation to implement the suggestion, applying the filter to the tenant data as the tenant data is imported to the service.

According to some examples, the tenant data to which the filter is applied may include communications, documents, and files. The filter may include an age of the tenant data, a type of the tenant data, or a user associated with the tenant data. The processors may be further configured to suggest additional filters based on the model, the additional filters including a sensitive data filter and a junk data filter. The security and compliance system may be an integral module of the service. The security and compliance system may be an integral module of a client application associated with the service that is locally installed on the one or more client devices. The security and compliance system may be a separate system associated with a protection service.

According to further examples, a system configured to provide selective import of data to a service through a security and compliance system associated with the service. The system may include a first server configured to host the service for a tenant and one or more users and a second server. The second server may include a communication interface configured to facilitate communication between the first server and the second server; a memory configured to store instructions; and one or more processors coupled to the communication interface and the memory. The one or more processors may be configured to analyze data, usage pattern, and security and compliance policies associated with the tenant; create a model for importing tenant data based on the analysis by employing machine learning or artificial intelligence (AI); present a suggestion to the tenant based on the model through a dashboard associated with the security and compliance system, where the suggestion includes a filter to be selected for importing tenant data; and in response to receiving a selection of the filter, apply the filter to the tenant data as the tenant data is imported to the service.

According to yet other examples, the processors may be further configured to present an option to customize the filter to the tenant, where the option includes modification of the filter, addition of other filters, or deletion of the filter to customize the filter; and in response to detecting a customization of the filter by the tenant, adjust the model based on the customization. The processors may also be configured to monitor importation of the tenant data in accordance with the filter; create a compliance report based on the monitoring; analyze and determine modifications for the filter based on the compliance report; and adjust the model based on the modifications.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide selective data importation to a hosted service, the method comprising:
    creating a model for importing tenant data of a tenant to the hosted service based on a usage pattern associated with the tenant, a security and compliance policy implemented by the tenant on the tenant data, and a profile of the tenant, wherein the profile includes one or more of an industry, a size, a geographical location, a role, a regulatory requirement, and a legal requirement associated with the tenant;
    generating a filter for importing the tenant data based on the model; and
    applying the filter to the tenant data as the tenant data is imported to the hosted service.

2. The method of claim 1, wherein applying the filter to the tenant data as the tenant data is imported to the hosted service includes automatically applying the filter to the tenant data as the tenant data is imported to the hosted service.

3. The method of claim 1, further comprising:
    presenting a plurality of pre-defined filter options to the tenant for selection through a dashboard;
    receiving a selection of one of the plurality of pre-defined filter options; and
    applying the one of the plurality of pre-defined filter options to the tenant data as the tenant data is imported to the hosted service.

4. The method of claim 1, further comprising:
    presenting, to the tenant, an option to customize the filter through a dashboard.

5. The method of claim 4, further comprising:
    in response to receiving a customization of the filter by the tenant, adjusting the model based on the customization.

6. The method of claim 1, further comprising:
    monitoring importation of the tenant data in accordance with the filter.

7. The method of claim 6, further comprising:
    creating a compliance report based on the monitoring.

8. The method of claim 7, further comprising:
    determining a modification for the filter based on the compliance report.

9. The method of claim 8, further comprising:
    adjusting the model based on the modification.

10. The method of claim 1, wherein creating the model comprises:
    employing machine learning or artificial intelligence (AI) to create the model.

11. A server configured to provide selective data importation to a service, the server comprising:
    a communication interface configured to facilitate communication between another server hosting the service for a tenant, one or more client devices, and the server;

a memory configured to store instructions; and one or more processors coupled to the communication interface and the memory, the one or more processors configured to:

create a model for importing tenant data of the tenant to the service based on a usage pattern associated with the tenant, a security and compliance policy implemented by the tenant on the tenant data, and a profile of the tenant, wherein the profile includes one or more of an industry, a size, a geographical location, a role, a regulatory requirement, and a legal requirement associated with the tenant;

generate a filter for importing the tenant data based on the model; and apply the filter to the tenant data as the tenant data is imported to the service.

12. The server of claim 11, wherein the tenant data to which the filter is applied includes at least one of a communication, a document, and a file.

13. The server of claim 11, wherein the filter includes at least one of an age of the tenant data, a type of the tenant data, and a user associated with the tenant data.

14. The server of claim 13, wherein the one or more processors are further configured to suggest an additional filter based on the model, the additional filter including at least one of a sensitive data filter and a junk data filter.

15. The server of claim 12, wherein the tenant data is imported to the service via a security and compliance system, wherein the security and compliance system is an integral module of the service.

16. The server of claim 12, wherein the tenant data is imported to the service via a security and compliance system, wherein the security and compliance system is an integral module of a client application associated with the service that is locally installed on the one or more client devices.

17. The server of claim 12, wherein the tenant data is imported to the service via a security and compliance system, wherein the security and compliance system is associated with a protection service separate from the service.

18. A system configured to provide selective data importation to a service, the system comprising:

a first server configured to host the service for a tenant; and a second server, comprising:

a communication interface configured to facilitate communication between the first server and the second server;

a memory configured to store instructions; and one or more processors coupled to the communication interface and the memory, the one or more processors configured to:

create a model for importing tenant data of the tenant to the service based on a usage pattern associated with the tenant, a security and compliance policy implemented by the tenant on the tenant data, and a profile of the tenant, wherein the profile includes one or more of an industry, a size, a geographical location, a role, a regulatory requirement, and a legal requirement associated with the tenant;

generate a filter for importing the tenant data based on the model; and applying the filter to the tenant data as the tenant data is imported to the service.

19. The system of claim 18, wherein the one or more processors are further configured to:

present, to the tenant, an option to customize the filter, wherein the option includes one of a modification of the filter, an addition of another filter, and a deletion of the filter; and in response to receiving a customization of the filter from the tenant, adjust the model based on the customization.

20. The system of claim 18, wherein the one or more processors are further configured to:

monitor importation of the tenant data in accordance with the filter;

create a compliance report based on the monitoring;

determine a modification for the filter based on the compliance report;

adjust the model based on the modification.

* * * * *